United States Patent [19]
Davis

[11] 3,747,446
[45] July 24, 1973

[54] PIPE TRACKING APPARATUS AND METHOD
[75] Inventor: Paul K. Davis, Alameda, Calif.
[73] Assignee: Pacific Roller Die Co., Inc., Hayward, Calif.
[22] Filed: May 17, 1971
[21] Appl. No.: 143,811

[52] U.S. Cl............................................. 82/53.1 R
[51] Int. Cl............................................. B23b 37/00
[58] Field of Search................................. 82/53.1 R

[56] References Cited
UNITED STATES PATENTS

| | | | |
|---|---|---|---|
| 3,043,576 | 7/1962 | Diener | 82/53.1 R |
| 3,630,113 | 12/1971 | Ronai | 82/53.1 R |
| 3,198,043 | 8/1965 | Davis | 82/53.1 R |
| 3,157,079 | 11/1969 | Harper | 82/53.1 R X |
| 2,682,307 | 6/1954 | Overman | 82/53.1 R X |
| 3,332,675 | 7/1967 | Bandura et al. | 82/53.1 R X |
| 1,641,866 | 9/1927 | Roberts | 82/53.1 R |

Primary Examiner—Harrison L. Hinson
Attorney—Boyken, Mohler, Foster & Schwab

[57] ABSTRACT

Pipe tracking apparatus and method and cutoff apparatus and method incorporating same, for pipe traveling longitudinally in a direction and rotating about its longitudinal axis. A tracking carriage mounts pipe engaging means having pipe engaging portions each adapted for engaging the pipe for a sustained interval. The carriage is moved a predetermined distance with the pipe at the rate of travel thereof in such direction, as the pipe engaging portions successively effect a pipe engaging relationship with the pipe. The carriage supports a pipe cutoff tool.

9 Claims, 9 Drawing Figures

INVENTOR.
PAUL K. DAVIS
BY Boyken, Mohler, Foster & Schwab
ATTORNEYS 3,747,446

PIPE TRACKING APPARATUS AND METHOD

BACKGROUND OF THE INVENTION

This invention relates to pipe manufacturing and processing, and more particularly to tracking apparatus and a method for tracking pipe moving along its longitudinal axis and rotating about such axis, such as continuously formed helical sheet metal pipe. The invention also relates to pipe cutoff apparatus and a cutoff method incorporating the tracking apparatus and method.

The invention is advantageously employed in conjunction with the type of pipe forming machine wherein a strip of sheet metal is formed into helical convolutions, and the adjacent edges of the convolutions are joined to provide a seam and yield a continuous sheet metal pipe. One form of pipe forming machine with which this invention may be employed to advantage is disclosed in my co-pending application Ser. No. 796,437, filed Feb. 4, 1969, for "Helical Pipe Making Apparatus and Method", which issued to U.S. Pat. No. 3,650,015, Mar. 21, 1972. Pipe formed in such machine and issuing therefrom advances along its longitudinal axis and also rotates about such axis.

After formation of the pipe, in order to stack, transport and ultimately utilize it in, for example, culvert and other pipeline installations, it is necessary to cut the discharging pipe into suitable lengths. It may also be desired to perform accurately other pipe processing operations such as, circumferential scoring, marking or welding, at predetermined intervals along the pipe length, edge-trimming or other edge-treating operations, as the pipe is advancing.

It has been found that non-uniformities in the pipe materials, deviations in dimensions of the formed pipe, and rotational speed variations inherent in the pipe-driving elements of pipe forming machinery cause the rate of speed of pipe issuing from the forming machine to vary from a constant rate. As a consequence, sever problems have been encountered in performing such operations as pipe cutoff operations because of the difficulty of matching the rate of advance of a cutoff tool with that of the discharging pipe. The matching of such rates is critical if it is desired to obtain an accurate cut in a plane normal to the pipe axis. Continuous pipe forming machinery with which this invention may be employed is capable of forming pipe having diameters ranging from a fraction of one foot to the order of ten or twelve feet. In the case of the larger diameter pipe defects in cuts resulting from differences between the rates of advance of discharging pipe and the cutting tool are exaggerated.

SUMMARY OF THE INVENTION

In this invention, problems inherent in cutting and otherwise processing pipe continuously discharging from pipe forming machinery, are avoided by provision of a pipe tracking apparatus and method utilizing tracking carriage means adapted to be continuously engaged and advanced with the advancing pipe while the pipe moves a distance sufficient to enable completion of the desired pipe cutoff or other processing operation. By supporting a pipe cutting or other pipe processing tool for movement with the carriage means there is provided a pipe processing apparatus that moves at a speed that is inherently matched to the speed of the advancing pipe for accurate performance of the desired operation.

It is therefore an object of this invention to provide a novel pipe tracking apparatus and method for use in conjunction with a pipe forming machine from which completed pipe issues along its longitudinal axis and rotates about such axis.

It is an additional object of this invention to provide a pipe tracking apparatus for pipe that is advancing along its longitudinal axis and rotating about such axis, which apparatus is advanced at a rate that is inherently matched to the rate of advance of such pipe.

Another object is the provision of novel pipe engaging means in pipe tracking apparatus for maintaining a pipe engaging relationship with pipe advancing along its longitudinal axis and rotating about such axis for a predetermined distance of advancement of the pipe sufficient to enable completion of a pipe cutoff or other pipe processing operation on the advancing pipe.

A further object is to provide a pipe tracking apparatus and method for utilization in a pipe cutoff or other pipe processing operation, and which will inherently match the rate of advance of pipe processing apparatus to the rate of advance of pipe advancing along its longitudinal axis and rotating about such axis.

Other objects and advantages of the invention will become apparent from the following description of a preferred embodiment of the invention.

DESCRIPTION OF A PREFERRED EMBODIMENT

Figures 1, 2:
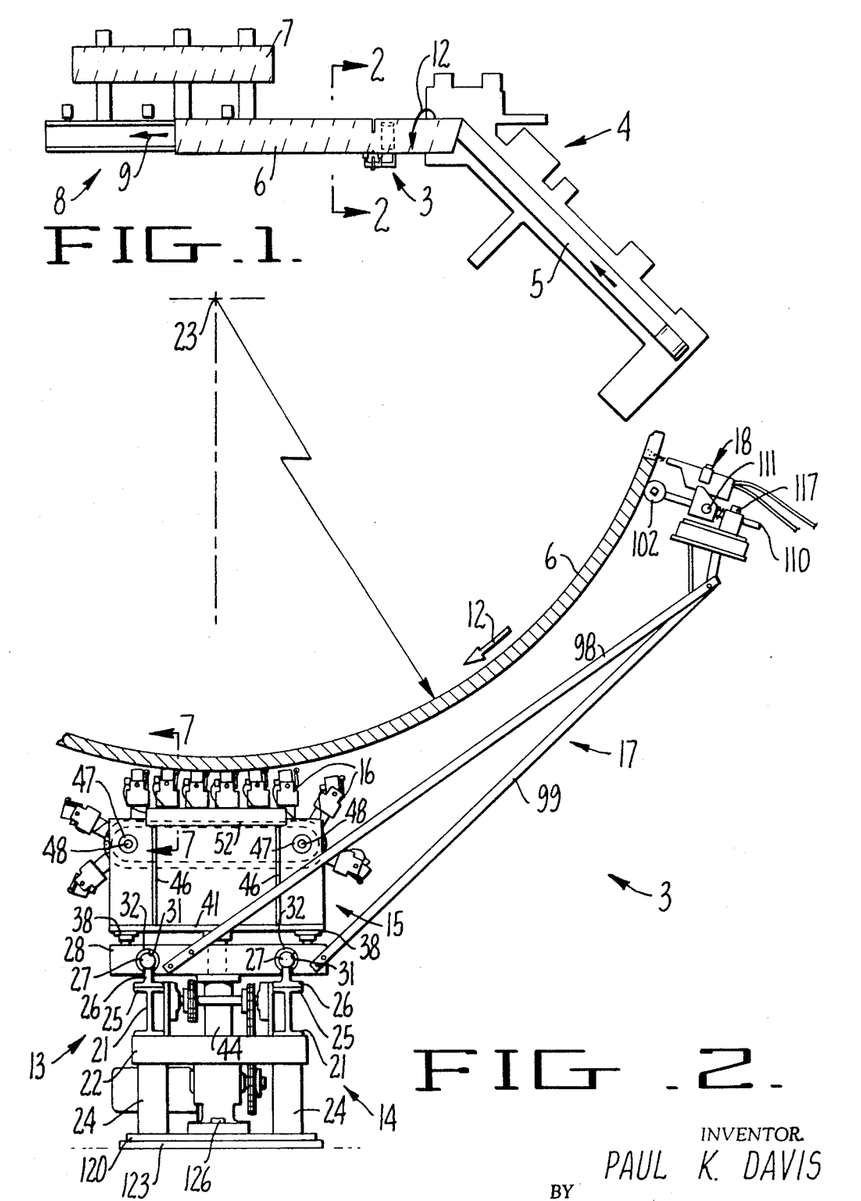
FIG. 1 is a diagrammatic top plan view illustrating continuous pipe forming and handling apparatus incorporating an embodiment of the pipe cutoff apparatus of this invention.
FIG. 2 is a sectional view taken along line 2—2 of FIG. 1, illustrating a preferred embodiment of the pipe cutoff apparatus of this invention, in association with a portion of completed pipe, on a scale enlarged relative to FIG. 1.

In detail, FIG. 1 illustrates in diagrammatic form, an embodiment of the pipe cutoff apparatus of this invention, generally designated 3, utilized in association with continuous sheet metal pipe forming machinery, which may be of the type disclosed in the aforementioned U.S. Pat. No. 3,650,015. In such pipe forming machinery 4, a strip of sheet metal 5 is withdrawn from a coil, flattened and thereafter formed into helical convolutions. The adjacent edges of the convolutions are joined into a seam to thereby form continuous sheet metal pipe 6. Pipe cutoff apparatus 3 is employed to cut the completed pipe 6 into pipe lengths 7 which conveniently may be moved from the path of discharging pipe 6 at a pipe transfer station 8.

The completed pipe 6 discharged from forming machinery 4, advances in a path along its longitudinal axis (FIGS. 1 and 3), in the direction of arrow 9 (toward the left in FIGS. 1 and 3) and rotates abouts its longitudinal axis, in the direction indicated by arrow 12 (FIG. 1, 2 and 3), as a result of the helical pipe forming operation.

A preferred embodiment of pipe cutoff apparatus 3 (FIGS. 2 and 3) comprises a pipe tracking apparatus, generally designated 13 having an elongated base or track structure 14 (FIGS. 2 and 3) below and extending parallel to the path of the discharging pipe 6 and centered directly below the axis of the pipe. A carriage means, such as tracking carriage 15 is supported for movement in opposite directions along track structure 14 and carries pipe engaging means having a plurality of similar pipe engaging assemblies 16 mounted for movement transversely of the path of pipe 6 and adapted for successively engaging the under surface of the pipe and cooperatively maintaining continuous engagement therewith during longitudinal and rotational movement of the pipe. Tracking carriage 15 also carries tool support 17 for a pipe cutting tool 18. In a preferred embodiment of the invention described herein, pipe engaging assemblies 16 maintain a desired pipe engaging relationship by means of electromagnets, so that a ferrous material, such as sheet steel, is utilized in forming pipe 6. However, for nonferrous material, pipe engaging assemblies utilizing vacuum suction or friction may be employed.

Figures 3, 4:
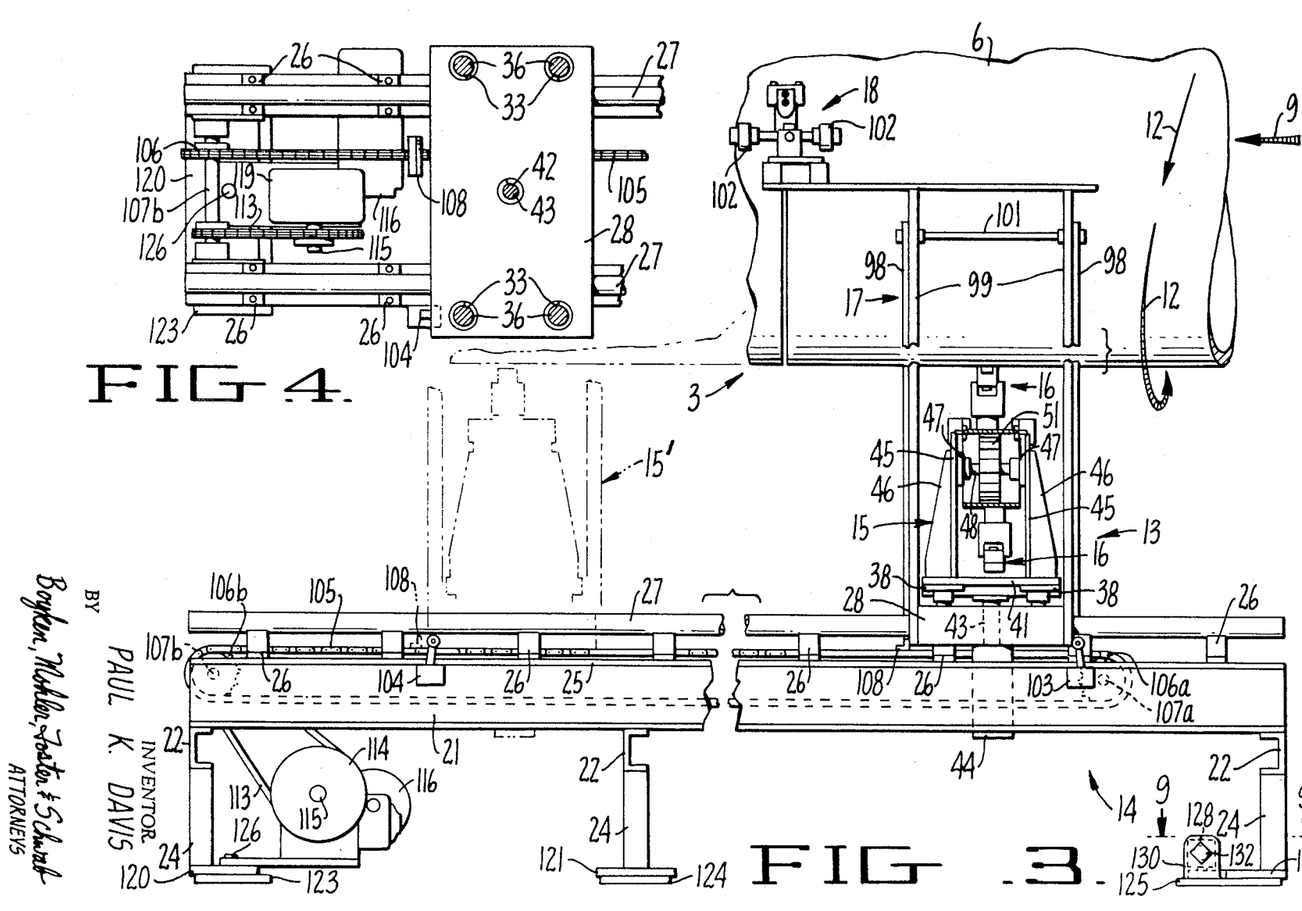
FIG. 3 is a side elevational view of the pipe cutoff apparatus in FIG. 2 including the pipe tracking apparatus thereof.
FIG. 4 is a fragmentary top plan view illustrating drive apparatus and a portion of a tracking carriage in the apparatus of FIG. 2, positioned at completion of a pipe processing operation.
Figure 5:
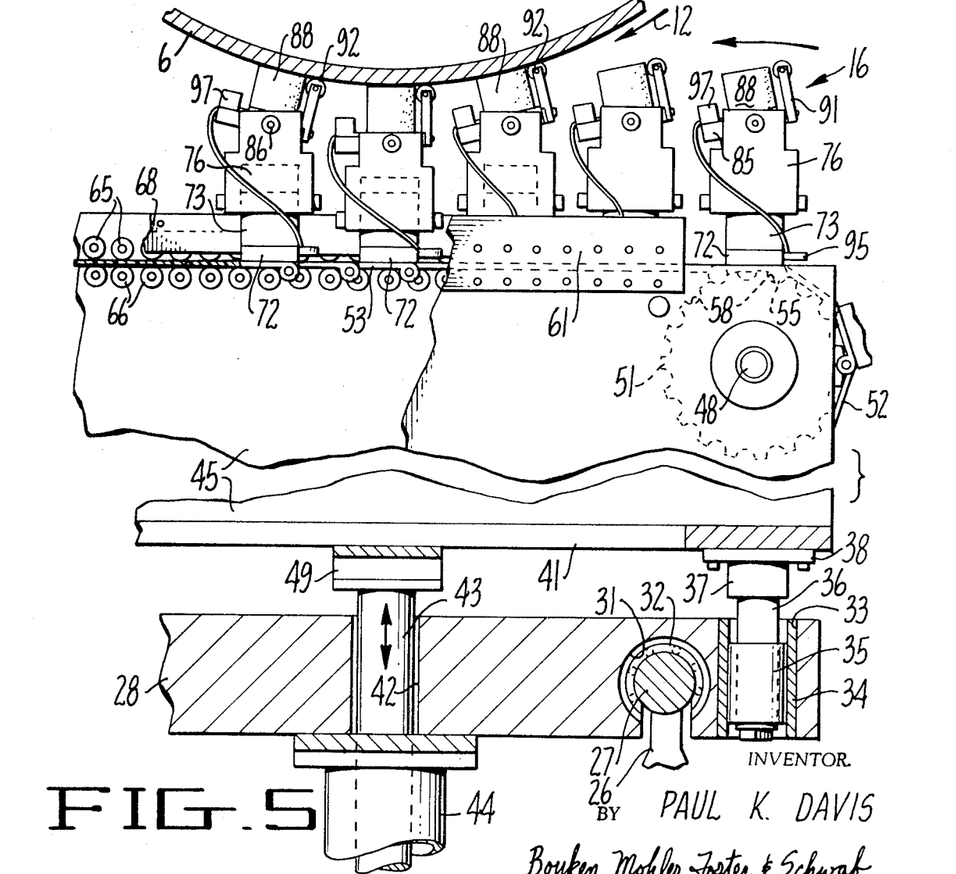
FIG. 5 is a fragmentary end view of a portion of the tracking carriage in the embodiment of FIG. 2 with pipe engaging assemblies thereon.

Tracking structure 14 comprises a pair of horizontally extending, horizontally parallel "I" members 21 (FIGS. 2 and 3) symmetrical with respect to the longitudinal axis 23 (FIG. 2) of pipe 6 and mounted on a plurality of horizontal cross members 22 (FIGS. 2 and 3), each on a pair of legs 24 for elevating "I" members 21 relative to a floor surface. "I" members 21 each have an upper horizontal flange portion 25 (FIGS. 2 and 3) on which are a plurality of regularly spaced riser members 26 which mount a cylindrical rail 27 (FIGS. 2, 3 and 5).

A rectangular, horizontally disposed carriage plate 28 (FIGS. 2, 3 and 5) is provided with a pair of parallel throughslots 31 of generally keyhole shaped crosssection (FIGS. 2 and 5), each of which receives a ball bushing 32 that is coextensive in cross-section with the upper rounded portion of slot 31. Carriage plate 28 is thereby adapted to receive rails 27 and travel therealong. Each corner of carriage plate 28 has a vertically directed cylindrical bore 33 (FIGS. 4 and 5), each of which receives a sleeve 34 (FIG. 5) which in turn receives a ball bushing 35 through which slidably extends a post 36 (FIGS. 4 and 5) the upper end of which carries a member 37 (FIG. 5) and an annular horizontal end flange 38.

A rectangular carriage housing base plate 41 (FIGS. 2, 3 and 5) is bolted to flanges 38 to overlie carriage plate 28. A vertical cylindrical bore 42 (FIG. 5) extends through the center of carriage plate 28 and receives a piston rod 43 of a conventional, double-acting hydraulic cylinder 44 (FIGS. 2, 3 and 5) fixed to the underside of carriage plate 28, and the upper end of piston rod 43 carries a connecting block 49 fixed to the underside of base plate 41 whereby base plate 41 will be moved vertically with piston rod 43 relative to carriage plate 28.

Figure 6:
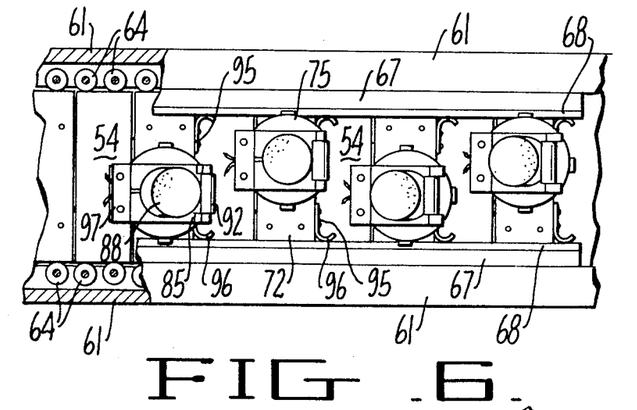
FIG. 6 is a fragmentary, top plan view of the pipe engaging assemblies of FIG. 5 and associated tracking carriage structure.
Figures 7, 9:
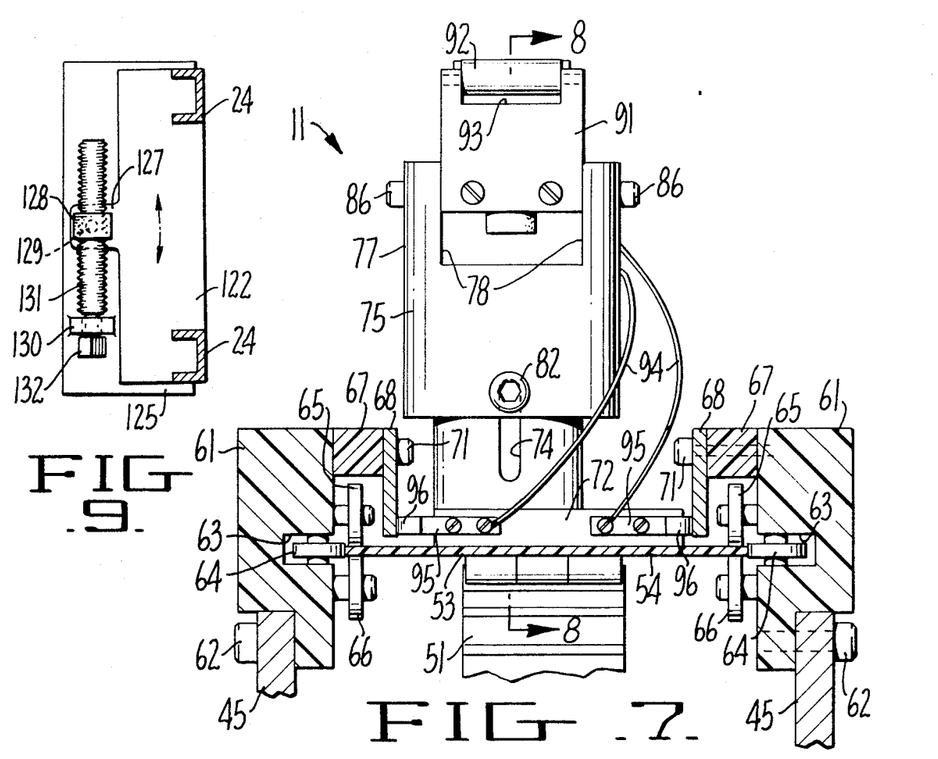
FIG. 7 is a sectional view taken along line 7—7 of FIG. 2, illustrating a single pipe engaging assembly and associated tracking carriage structure, on a scale enlarged relative to FIG. 2.
FIG. 9 is a fragmentary plan view of track adjustment means as seen generally from line 9—9 of FIG. 3.
Figure 8:
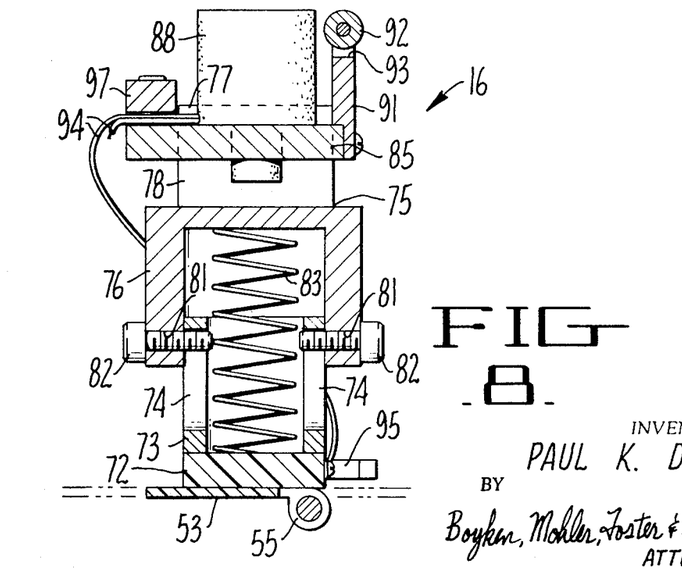
FIG. 8 is a sectional view of the pipe engaging assembly of FIG. 7, taken along line 8—8 of FIG. 7.

On base plate 41 a pair of upright parallel housing walls 45 (FIGS. 3 and 5) extend transversely of the path of pipe 6, each wall being reinforced by a pair of vertical ribs 46 (FIGS. 2 and 3) fixed to their outer surfaces and the upper surface of base plate 41. Base plate 41 and walls 45 provide a housing for the pipe engaging means comprising pipe engaging assemblies 16 (FIGS. 3, 5, 6, 7 and 8) and associated structure. Each upper corner portion of walls 45 mounts a bearing 47 (FIGS. 2, 3 and 5), and opposed pairs of bearings 47 each rotatably receives the opposite ends of one of a pair of shafts 48 that extend between walls 45. A sprocket wheel 51 (FIGS. 5 and 7) having a substantial thickness, is fixed centrally on each shaft 48. An endless belt 52 (FIGS. 2 and 5) consisting of articulated rigid plate links 53 (FIGS. 5 and 7), fabricated of an electrically insulating material, is engaged around the pair of sprocket wheels 51, such that there is provided a pair of horizontal belt runs. As best seen in FIGS. 6 and 7, each link 53 includes a rectangular plate portion 54 having a width substantially spanning the distance between walls 45. The plate links 53 are hinged together at a hinge portion 55 received in rounded grooves 58 of sprocket wheel 51.

Horizontally elongated blocks 61 (FIGS. 5 and 7) are bolted to the upper ends of walls 45 by bolts 62 (FIG. 7) and extend for the major part of the distance of extent of the horizontal runs of belt 52. Each block 61 (FIG. 7) is formed with an inwardly facing rectangular groove 63 at the level of the upper run of belt 52, extending the full length of block 61. Within groove 63 in closely spaced intervals therealong is a plurality of horizontal edge-guide wheels 64 mounted and positioned for rotatably contacting a side edge surface of the links 53 of belt 52. Rotatably mounted at closely spaced intervals throughout the length of the inward facing surface of each block 61, above groove 63, is a plurality of vertically disposed upper guide wheels 65. A corresponding plurality of lower guide wheels 66 is mounted below groove 63, and the pluralities of wheels 65 and 66 provide series of pairs of vertically aligned vertical guide wheels for opposedly contacting the upper and lower surfaces of the side edge portion of links 53 of belt 52, and cooperatively with horizontal guide wheels 64 provide guidance and rigid support for the upper run of belt 52.

The upper portion of the inner facing surface of each block 61 mounts a spacer bar 67 (FIG. 7) that extends the full length of block 61. Spacer bar 67 is fabricated of an electrically insulating material and has mounted to its inward facing surface a conductor plate 68, that depends to a point immediately above the upper surface of the upper run of belt 52. Spacer bar 67 and conductor plate 68 are fastened to block 61 by a series of bolts 71 (only one such bolt 71 being shown in FIG. 7 for each block 61).

On each alternate link 53 of belt 52 is mounted a pipe engaging assembly 16 (FIGS. 5, 6, 7 and 8) including a rectangular base plate 72, on which is an upstanding cylindrical member 73 (FIGS. 7 and 8) having a pair of axially extending, opposed slots 74. Base plate 72 and cylindrical member 73 are of an electrically insulating material. A cap member 75, includes a cup portion 76 that overlies cylindrical member 74, and a yoke portion 77 that provides an opposed pair of inwardy facing flat faces 78. Faces 78 lie in parallel planes with walls 45. A coil spring 83 is compressed within cylindrical member 73 and cup portion 76 of cap member 75 for urging the cap member in the direction away from belt 52. Cylindrical member 73 and cap member 75 are prevented from separating by a pair of bolts 82 (FIG. 8) threaded through apertures 81 in the open end of the cup portion 76 and projected through slots 74 in cylindrical member 73, but are permitted to slide relatively as bolts 82 move within slots 74. A rectangular pivot plate 85 is received between flat faces 78 of yoke portion 77 for pivoting on a pair of pivot screws 86 (FIG. 7) about an axis extending transversely of the direction of extent of belt 52. An electromagnetic pipe engaging element, such as cylindrical electromagnet 88 (FIGS. 5, 6 and 8) is fixed centrally on pivot plate 85. Pivot plate 85 also mounts an upstanding end plate 91 (FIGS. 7 and 8) fastened to an edge of pivot plate 85, which edge trails relative to the direction of advance of belt 52, as will be seen. The free end of end plate 91 is located at a point slightly short of the flat end surfaces of electromagnet 88 and mounts an elongated cylindrical roller 92 rotatably received within a rectangular notch 93 for rotation about an axis parallel to the axis of pivoting of pivot plate 85. The diameter of roller 92 is such that the roller periphery is at a point even with the flat end surface of electromagnet 88.

An electrical circuit is provided to energize electromagnets 88, comprising a pair of electrical wires 94 (FIGS. 7 and 8) respectively connected between electromagnet 88 and one of a pair of spring metal brushes 95 fastened to the trailing edge surface of insulating base plate 72. Each brush 95 projects to contact one of the pair of conductor plates 68 on spacer bar 67, at a curved contact portion 96 (FIG. 6). Electrical energy is provided directly to conductor plates 68 to energize electromagnet 88 through brushes 95 when the associated pipe engaging assembly 16 is located on the upper run of belt 52. A weight 97 (FIG. 8) is fastened to pivot plate 85 at the end opposite end plate 91 and serves the twofold purpose of holding wires 94 against plate 85 and also causing said plate to pivot to raise roller 92 when pipe engaging assembly 16 is in the upright position, although not in contact with the surface of pipe 6. In such pivoted position electromagnet 88 and roller 92 of pipe engaging assembly 16 are in optimum position for contacting the curved periphery of pipe 6, since, as seen in FIGS. 2 and 5, the periphery of pipe 6 curves downwardly in the direction of advance of belt 52 (and direction of rotation 2 of pipe 6) when initial contact between the pipe and pipe engaging assemblies is made. Successive pipe engaging assemblies 16 are offset a distance of approximately one inch transversely of the direction of advance of belt 52 to insure secure engagement between pipe 6 and electromagnet 88 in the event the pipe surface has irregularities or protrusions about its circumference caused by a welded or lock seam, or otherwise. It can be seen from the foregoing that pipe engaging assemblies 16 are adapted to be elevated into contact with the surface of pipe 6 by piston rod 43 of hydraulic cylinder 44, and the electromagnets 88 of a number of assemblies 16 are concurrently energized so that the assemblies cooperate to maintain engagement with the advancing and rotating pipe 6 and to advance tracking carriage 16 along rails 27 with the pipe.

It has been found that the direction of extent of belt 52 carrying pipe engaging assemblies 16 must accurately be held parallel to the direction of a diameter of pipe 6 to obtain an optimum circumferential cut, etc., in the pipe, Accordingly, adjustable means are provided for precise angular positioning of track structure 14 and carriage 15 relative to the pipe axis. A horizontal plate 120 (FIG. 3) is fixed to the bottom end of the pair of legs 24 at the output end of track structure 14 (at the left in FIG. 3), a similar plate 121 is fixed to the bottom end of each of the intermediate pairs of legs 24 and a plate 122 is fixed at the input end of track structure 14. Plate 120, 121 and 122 respectively rest on and are slidable on horizontal plates 123, 124 and 125 which are stationarily mounted on the floor or other supporting surface. A vertical pivot pin 126 extends through plates 120, 123 directly below the axis line of pipe 6. Means for adjustment of the position of track structure 14 about pin 126 (FIG. 9) includes a screw 131 threadedly received in a nut 128 pivotally mounted by a vertical pin 129 on a stud 127 projecting from bottom plate 125. Screw 131 is also rotatably received through a collar 130 integral with upper plate 122. Desired pivoting of track structure 14 and carriage 15 about pin 126 is accomplished by turning the head 132 of screw 131, it being appreciated that screw 131 is used in effecting fine rather than gross adjustments.

As seen in FIGS. 2 and 5, electromagnets 88 of assemblies 16 each maintain a pipe engaging relationship with the surface of the advancing pipe 6 during a portion of their travel along the upper run of belt 52. While so engaged, the pipe contacting surface of an assembly 16 travels along the same helical path as a fixed point on the surface of pipe 6. The apparatus thus yields a pipe tracking method wherein there is a sustained, as opposed to an instantaneous pipe engaging relationship between an element of a pipe engaging means and the surface of a longitudinally advancing and rotating pipe. The method also involves the continuous maintenance of the pipe engaging relationship between the pipe engaging means on carriage 16 and pipe surface during advance of the pipe sufficient to permit completion of a desired pipe cutoff or other pipe processing operation.

Tool support 17 for pipe cutting tool 18 or other pipe processing tool (FIGS. 2 and 3) may be constructed of a pair of upper frame members 98, respectively connected to the opposite side edges of carriage plate 28 and extending angularly upwardly therefrom to one side of pipe 6, a pair of lower frame members 99, at their lower ends similarly connected to carriage plate 28 and at their upper ends connected to the upper ends of frame members 98, and a cross-member 101 extending between the pairs of frame member 98 and 99. On frame members 99 above the point of connection with frame members 98 there is mounted the metal cutting torch 18 of conventional construction (FIGS. 2 and 3). The head end of torch 18 may be positioned in cutting relation with pipe 6 by adjustment along a support rod 110 by adjusting screw 111 and maintained in such position by a pair of projecting rollers 102 provided for engaging pipe 6 and positionable relative to torch 18 and through adjusting screw 117 on rod 110, relative to pipe 6.

Tracking carriage 15 is advanced along rails 27 by engagement of electromagnets 88 of pipe engaging assemblies 16 with the pipe surface. Actuating means for causing pipe engaging assemblies 16 to be moved into pipe contacting position, release means for causing the assemblies to be moved therefrom and return means for returning carriage 15 to an initial position may include a microswitch 103 (FIG. 3) mounted on the outer side of member 21 with a trip arm positioned to be engaged by the edge of carriage plate 28 trailing relative to the direction of advance of pipe 6. Microswitch 103 actuates elevation of pipe engaging assemblies 16 through hydraulic cylinder 44, and is located along member 21 to be tripped by the trailing edge of plate 28 when the carriage is at its desired starting position. A second microswitch 104 is positioned on member 21 with its trip arm positioned to be engaged by the leading edge of carriage plate 28 when the carriage is positioned at its furthest point of travel. Tripping of microswitch 104 causes lowering of pipe engaging assemblies 16 and actuation of the carriage return drive means. Such drive means comprises an endless chain 105 (FIG. 3) engaged around a pair of sprocket wheels 106a, 106b (FIG. 3) respectively fixed on shafts 107a (FIG. 3) and 107b (FIGS. 3 and 4) rotatably mounted between the pair of members 21. Chain 105 carries a dog 108 positioned for engagement with the leading edge of carriage plate 28. Also fixed on shaft 107b with sprocket wheel 106b is a sprocket wheel 112 around which is engaged an endless chain 113 which also is engaged around a sprocket wheel 114 fixed on a shaft 115 of a drive motor 116 of conventional construction including a conventional electrically actuated clutch assembly 116 which permits free movement of sprocket wheel 114 and chains 113 and 105 when dog 108 is urged in the direction of advance of pipe 6 by the leading edge of carriage plate 28.

In operation, FIG. 3 illustrates a portion of pipe 6 moving axially in the direction indicated by arrow 9 (to the left in FIG. 3) and rotating in the direction of arrow 12. Tracking carriage 15 is accurately aligned with respect to the pipe axis through fine adjustment of screw 131 and is positioned at an initial point along rails 27 for initiation of a pipe cutoff (or other pipe processing) operation. Microswitch 103 is engaged by the edge of carriage plate 21 trailing with respect to the direction of advance of pipe 6, and hydraulic cylinder 44 is actuated so that engaging assemblies 16 are in the elevated position relative to carriage plate 28 as a result of extension of piston rod 43. In such elevated position the flat upper surfaces of electromagnets 88 of pipe engaging assemblies 16 positioned on the end portion of the upper run of belt 52, prior to contact with pipe 6, are located a fraction of an inch above the lowest point on the periphery of the pipe. The weights 97 cause the pivot plate 85 of such assemblies to be inclined so that the top surfaces of electromagnets 88 are presented to the pipe surface in optimum positioned for contact without interference by the electromagnet edges. Pivot plate 85 also enables electromangnet 88 to maintain a pipe engaging relationship as it moves from one side of the pipe axis to the opposite side thereof. Tripping of microswitch 103 also actuates the cutting tool, such as cutting torch 18, and energizes electromagnets 88 of assemblies 16 on the upper run of belt 52 between conductor plates 68.

The centers of successive electromagnets 88 are spaced along belt 52 approximately three inches apart so that the electromagnets 88 of at least three pipe engaging assemblies 16 concurrently will contact the pipe surface. The upper portions of such assemblies 16 in contact with the pipe are compressed against springs 83 to varying degrees depending upon their location along the pipe periphery, the slots 74 in cylindrical member 73 permitting cap member 75 to slide over the cylindrical member 73 a maximum distance of approximately three-quarters of an inch. To prevent damage to pipe 6 or tracking carriage 15, hydraulic pressure to cylinder 44 controlling piston rod 43 is regulated, such that piston rod 43 will be retracted and base plate 41 with the housing structure thereon will be lowered, in the event the upper cap member 75 of an assembly 16 is urged downwardly by pipe 6 a greater distance than the approximately three-quarters of an inch permitted by slots 74.

Advancement of carriage 15 along rails 27 is initiated as the energized electromagnets 88 are magnetically engaged with pipe 6 and are drawn therewith. The rotation of pipe 6 causes belt 52 to be advanced and thereby to bring successive assemblies 16 into contact and magnetic engagement with the pipe, so that a plurality of at least three of the assemblies 16 are in engagement with the pipe at all times. The considerable width of sprocket wheels 51 carrying belt 52, and the pluralities of guide wheels 64, 65, 66 therefor provide an extremely strong mounting for the upper run of belt 52 and pipe engaging assemblies 16 thereon.

As carriage 15 advances, the leading edge of base plate 28 engages dog 108 on chain 105 and causes the chain to be advanced with the carriage until the carriage has traveled a sufficient distance to permit completion of the cutoff operation (as at 15' in FIG. 3). Microswitch 104 is located to be engaged by the leading edge of plate 28 when the carriage has traveled such distance. Tripping of microswitch 104 causes de-energization of electromagnets 88 and actuation of hydraulic cylinder 44 to retract assemblies 16 from pipe 6, through retraction of cylinder rod 43 (FIG. 5). Also, through microswitch 104, drive motor 116 is energized and clutch 115 is engaged, for driving chain 105 in the direction opposite to the direction of advance of pipe 6. Cutting tool 18 is also deactuated through microswitch 104. On driven chain 105 dog 108 engages the edge of carriage plate 28 to return tracking carriage 15 to its initial position along rails 27, at which position, microswitch 103 is tripped by the opposite edge of plate 28 to de-energize drive motor 116 and initiate a succeeding cycle of operations. Since the rate of advance of carriage 15 is inherently matched to that of the discharging pipe a true circumferential cut is obtained despite variations in such rate of advance. The rate at which carriage 15 is returned to its starting point affects the length of the resulting cut pipe section.

As seen from the foregoing, the tracking method involves initiating a pipe engaging relationship between a surface of pipe 6 and pipe engaging means incorporating assemblies 16, at a first point along the pipe axis (FIG. 3). The relationship is continuously maintained until the carriage 15 with the pipe engaging means is moved to a second point along the axis sufficient to permit completion of a pipe processing operation.

Throughout such movement a portion of the pipe engaging means, e.g., at least one or more of the assemblies 16, effects an engaging relationship with a fixed portion of the surface of pipe 6 for a sustained interval so that during the interval the portion of the pipe engaging means follows the path of a fixed point on the pipe surface, i.e., a helical path.

It is to be understood that the claims appended hereto are intended to cover all changes and modifications of the example herein chosen for purposes of disclosure which do not depart from the spirit and scope of the invention. For example, the invention may incorporate a unitary pipe engaging element instead of individual pipe engaging assemblies. In other modifications, vacuum suction or friction may be utilized for maintaining a pipe engaging relationship. In other variations the pipe engaging assemblies may be specifically adapted for use on corrugated helical pipe, as by providing universal mountings for the electromagnets or forming an individual pipe engaging assembly of a plurality of individual, relatively movable electromagnets, enabling secure engagement with different pipe surface contours presented by corrugated pipe. It is also apparent that a variety of pipe processing tools may be employed in place of cutting torch 18.

I claim:

1. Tracking apparatus for pipe moving in a direction along its longitudinal axis and rotating about such axis, comprising:
   a. carriage means supported for movement a predetermined distance along a path parallel to said axis in said direction;
   b. pipe engaging means on said carriage means maintaining a continuous pipe engaging relationship with said pipe during movement of said pipe said predetermined distance for moving said carriage means with said pipe in said direction at the rate of movement of said pipe;
   c. actuating means operatively connected to said pipe engaging means for effecting a pipe engaging relationship between said pipe and said pipe engaging means when said carriage means is positioned at a first point along said path;
   d. release means operatively connected to said pipe engaging means for releasing said pipe engaging means from pipe engaging relationship with said pipe when said carriage means has been moved said predetermined distance to a second point along said path; and
   e. said pipe engaging means comprises a plurality of pipe engaging elements adapted for successively effecting said pipe engaging relationship with said pipe and cooperatively maintaining said relationship throughout movement of said carriage means said predetermined distance.

2. Tracking apparatus for pipe moving in a direction along its longitudinal axis and rotating about such axis, comprising:
   a. carriage means supported for movement at a predetermined distance along a path parallel to said axis in said direction;
   b. pipe engaging means on said carriage means maintaining a continuous pipe engaging relationship with said pipe during movement of said pipe said predetermined distance for moving said carriage means with said pipe in said direction at the rate of movement of said pipe;
   c. actuating means operatively connected to said pipe engaging means for effecting a pipe engaging relationship between said pipe and said pipe engaging means when said carriage means is positioned at a first point along said path;
   d. release means operatively connected to said pipe engaging means for releasing said pipe engaging means from pipe engaging relationship with said pipe when said carriage means has been moved said predetermined distance to a second point along said path; and
   e. said pipe engaging means comprises a plurality of pipe engaging assemblies spaced along a line of extent and adapted to be moved along said line transversely of the path of longitudinal movement of said pipe by engagement between said pipe and successive ones of said assemblies as said pipe rotates about its axis.

3. Tracking apparatus for pipe moving in a direction along its longitudinal axis and rotating about such axis, comprising:
   a. carriage means supported for movement a predetermined distance along a path parallel to said axis in said direction;
   b. pipe engaging means on said carriage means maintaining a continuous pipe engaging relationship with said pipe during movement of said pipe said predetermined distance for moving said carriage means with said pipe in said direction at the rate of movement of said pipe;
   c. actuating means operatively connected to said pipe engaging means for effecting a pipe engaging relationship between said pipe and said pipe engaging means when said carriage means is positioned at a first point along said path;
   d. release means operatively connected to said pipe engaging means for releasing said pipe engaging means from pipe engaging relationship with said pipe when said carriage means has been moved said predetermined distance to a second point along said path; and
   e. said pipe engaging means comprises:
      1. an endless belt-like means having a run extending transversely of the path of longitudinal movement of said pipe and adapted for movement in the direction of extent of said run, and
      2. a plurality of pipe engaging assemblies on said belt-like means and spaced therealong and adapted for successively effecting a pipe engaging relationship with said pipe and cooperatively maintaining such relationship as said belt-like means is moved in said direction of extent of said run by said rotation of said pipe about said axis.

4. The tracking apparatus of claim 1, wherein:
   f. said pipe engaging elements each are adapted to effecting an engaging relationship with a fixed portion of a surface of said pipe during a sustained interval such that during said interval said element follows the path of a fixed point on said surface.

5. The tracking apparatus of claim 1, particularly adapted for pipe formed of a ferrous material, wherein:
   f. said pipe engaging elements are magnetic elements for effecting said pipe engaging relationship by magnetic attraction.

6. The tracking apparatus of claim 2, wherein:

f. pipe engaging assemblies of said plurality are offset relatively in the direction of extent of said pipe axis.

7. The tracking apparatus of claim 2, wherein:
f. each of said pipe engaging assemblies includes;
  1. at least one pipe engaging element, and
  2. compressible means urging said element against the surface of said pipe.

8. In tracking apparatus for pipe moving in a direction along its longitudinal axis and rotating about such axis, tracking carriage means supported for movement a predetermined distance along a path parallel to said axis in said direction, comprising:
 a. a carriage portion movable relative to said pipe radially thereof;
 b. pipe engaging means on said carriage portion maintaining a continuous pipe engaging relationship with said pipe during movement thereof said predetermined distance for moving said carriage means with said pipe in said direction at the rate of movement of said pipe;
 c. means for moving said carriage portion radially relative to said pipe for moving said pipe engaging means thereof into and from a position for effecting a pipe engaging relationship with said pipe; and
 d. said pipe engaging means comprises a plurality of pipe engaging assemblies spaced along a line of extent and adapted to be moved along said line transversely of the path of longitudinal movement of said pipe by engagement between said pipe and successive ones of said assemblies as said pipe rotates about its axis.

9. The tracking carriage means of claim 8, particularly adapted for pipe formed of a ferrous material, wherein:
 e. each of said pipe engaging assemblies comprises;
  1. at least one electromagnetic element having a generally flat pipe engaging surface for effecting a pipe engaging relationship by electromagnetic attraction;
  2. spring means urging said surface against the surface of said pipe; and
  3. said electromagnetic element being mounted for pivoting about an axis parallel to said axis of said pipe whereby said pipe engaging surface is positionable at different angles of inclination during maintenance of said pipe engaging relationship.

* * * * *